UNITED STATES PATENT OFFICE.

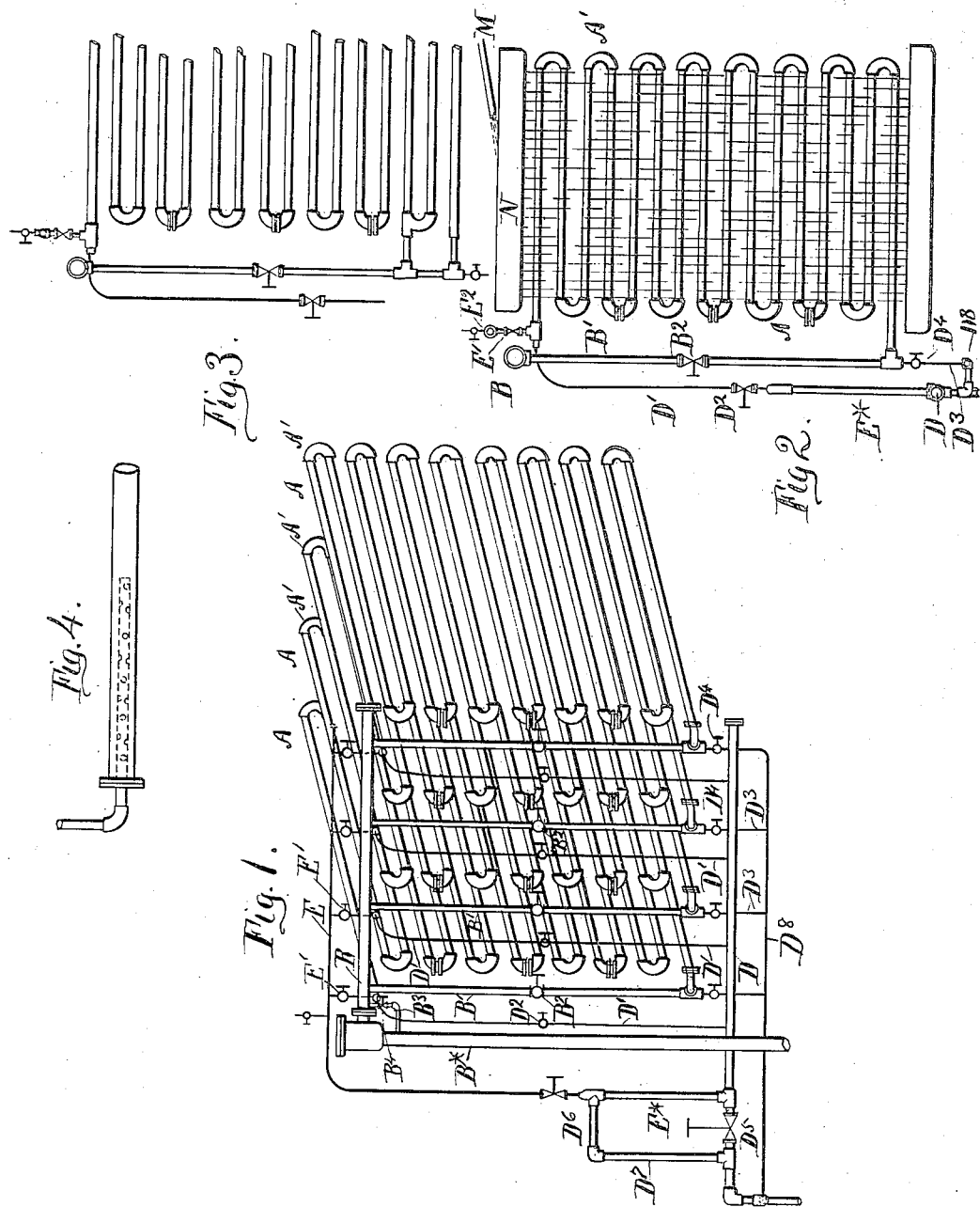

LOUIS BLOCK, OF MAMARONECK, NEW YORK.

METHOD OF CONDENSING AMMONIA.

1,056,144.　　　Specification of Letters Patent.　　Patented Mar. 18, 1913.

Application filed July 24, 1911. Serial No. 640,161.

*To all whom it may concern:*

Be it known that I, LOUIS BLOCK, a citizen of the United States, residing at Mamaroneck, in the county of Westchester and State of New York, engineer, doing business in the borough of Manhattan, in the city, county, and State of New York, have invented a new and Improved Method of Condensing Ammonia to Reduce it from the Gaseous to the Liquid Form.

I will describe the invention as receiving the gaseous ammonia in the usual condition at which it is received in this art, at a high temperature and at a pressure of say twelve atmospheres.

I employ coils in the ordinary form, sometimes called "trombone." I cool these coils by a descending current of cold water on its exterior. I introduce the gas at the bottom, and retain the condensed gas mingled with the uncondensed in a gradually diminished ratio as both together move rapidly upward.

There is an economical means of transferring heat known as "counter-current heat-exchanging"; my method involves this. There is an advantage in ultimately receiving the condensed ammonia for refrigerating and most other uses in the arts not only liquid but also cold. My method involves this. Heat is transferred more rapidly across between liquids than between gases and liquids. My method involves this. My method attains the heat exchanging and thus cools the gas with less pipe surface by reason of the hot gas entering at the bottom, giving up its superheat to the lowest pipes which the cooling water is just about to leave, and all the way up the rapidly cooling gas finds itself more and more cool by being under the influence of cooling water always only a little cooler. My method delivers the condensed ammonia colder than usual by reason of its leaving the upper pipe which is bathed in the latest-received water. And my method attains the more rapid transfer of heat by reason of using the condensed ammonia as an internal condensing agent and conveying the heat by such medium to the iron and then to the cold water.

In the working of my invention the ammonia enters the coil in the form of hot gas at the bottom. In rising, it parts first with its superheat and afterward with the latent heat which has before maintained its vaporous condition, which we may continue to call gaseous. If the hot gas enters the lowest pipe in any condensers now used in the art it is for the purpose of removing the superheat. It is in such condensers next transferred to the upper pipe of the coil and travels downward and the liquefied gas is discharged near the bottom. In some modifications the gas enters the lowest pipe and is caused to travel upward. In such however the pipes have been provided with liquid drains so that the liquid which forms by condensation is drained off as soon as it forms and the gas ascends dry.

I have discovered that it is practicable to cause the gaseous ammonia, and the liquid ammonia which is produced by its condensation to mix together, and to have the mixture move rapidly upward in the whole of the space, the proportion of the dense liquid being small at the bottom, and growing larger as the mixture rises, until all is liquid,—all is condensed ammonia, and is carried away as such from the top of the coil, cooled at last to a low degree. My method of operating utilizes this discovery. The invention gives an immense increase to the area of the condensing surface in a form which is distributed throughout the whole volume of the interiors of the pipes, by using the liquid ammonia to condense succeeding instalments of gaseous ammonia. The gas rises in globules, or bubbles, constantly growing smaller. The previously condensed ammonia in its form of a dense liquid fills the spaces and applies against the whole exterior of every globule of the gas, and against the whole inner surface of the metal of the pipes and of the returns. The previously condensed ammonia serves as an agent between the bubbles of gas and the inner surfaces of the metal. The act of condensation is proceeding over the whole of the immense surface presented by these small globules of gas. The heat moves outward rapidly from the bubbles into the dense liquid. The liquid in its turn circulates actively against the whole inner surface of the metal, and the heat moves outward rapidly from the liquid into the metal. The exteriors of the metal parts are cooled by the descending water, the coldest water striking on the coldest pipe, then on the next pipe below which is slightly warmer, and so on, giving the advantages of the long known counter-current heat exchanging.

I will be as specific as I am able with present information in regard to the increased activity of the transfer of heat by my method. Experiments in the arts have established that water or other similar liquids under similar conditions absorb heat from other water or liquid through metal (or when oppositely conditioned, impart heat to other liquids through metal) five times as fast as gaseous ammonia. With water to water the transfer of heat through iron or steel is 300 B. T. U. per hour while with gas to water as in ammonia condensers now in use the transfer is only 60 B. T. U. per hour for each square foot of surface and each degree of Fah. difference of temperature. We cannot know all the action under different conditions, but it is largely dependent upon how fast the heat of the liquid ammonia can be transferred through the iron pipes to the water flowing over them. The transfer of heat from the interior of the ammonia bubbles to the liquid ammonia surrounding them, and the transfer of heat from the dense liquid to the metal inclosing it and thence to the water outside, is probably about at the rate of 300 B. T. U. per hour. The two transfers of heat in my method are each made at a rate occupying only one fifth of the time which is required by the old method for its single transfer. Thus reckoned mathematically the efficiency of my method is greater than the ordinary in the ratio of 5 to 1. It is not important that these figures be exactly correct, I give them as the nearest now available.

The following is a description of what I consider the best means of carrying out the invention on a moderately large scale.

The accompanying drawings form a part of this specification.

Figure 1 is a perspective view of the main portion of the apparatus employed, and Fig. 2 is a side elevation of the same, with water-supply properly added. Fig. 3 is a side elevation of a portion, and Fig. 4 shows another modification in side elevation with dotted lines an internal pipe perforated to introduce the gas.

Similar letters and marks of reference indicate corresponding parts in all the figures.

I show iron pipes, preferably galvanized pipes, connected together as usual, in sections with returns. I show four sections each sixteen pipes high to obtain sufficiently extended condensing surfaces. I introduce the hot gaseous ammonia at the bottom of each section and cause it to move rapidly upward therein and to flow away steadily at the top in the form of dense liquid.

Referring to the letters of reference on the illustrative drawings, A A, etc., are horizontal iron pipes and $A^1$ are return bends or couplings by which each tier is united into what is sometimes termed a trombone coil. As shown these coils are mounted side by side. In these the condensing of the gaseous ammonia and also the preliminary cooling of it, and the subsequent further cooling of the liquefied ammonia is effected.

B is a horizontal pipe which receives the gaseous ammonia through a vertical pipe $B^*$ and an intermediate check valve and distributes it to the several coils through the means of descending pipes B' B', etc., controlled by cocks or valves $B^2$, and joined to the trombone coils with proper care to maintain tight joints as will be understood.

D is a pipe which takes away the condensed ammonia, receiving it through the branches D' extending up and down, and making proper tight connections with the uppermost pipe in each of the coils. It is essential that these branch pipes D' and the header pipe D should have sufficient internal area to carry away the liquefied ammonia as it reaches the top of the coil. Roughly each pipe D' must be of sufficient size to carry away 200 gallons of liquefied ammonia per hour from the condenser to the liquid receiver not shown. The latter is located in the engine room while the condensers are placed upon the floor above and since the top of the liquid receiver is equalized with the top of the condensers, the hydraulic pressure under which the liquefied ammonia is forced through the condensers is that which is due to the static head plus the pressure due to the momentum of the inrushing gas less the friction head.

$D^2$ are stop valves or cocks in the pipes D. There is a separate trough for condensing water over each of these coils with a separate supply pipe for each, as indicated in Fig. 2, where M is the supply pipe and N the trough for each. The gaseous ammonia flows inward continuously past the check valve into the pipe B and down through the several pipes B' into the base of each coil. It flows through the condensers by moving alternately to the right and left through the several straight pipes A and upward through the several returns A' till it reaches the top, becoming condensed and also cooled in the passage in the manner explained above by giving its heat ultimately to the shower of cold water descending outside from pipe to pipe. The condensed ammonia descends through the branch delivery pipes D' into the general delivery pipe D and is led away by the latter.

There is a liability to difference of pressure in the several coils. This is avoided by providing an equalizing header or pipe E, which communicates by a vertical extension downward with the liquid header D and also communicates independently with the several coils by branches E' controlled by cocks or valves $E^2$.

It is sometimes desired to allow the gas to flow backward from the pipe B past the check valve; to attain this I provide a by-pass pipe B³ controlled by a cock or valve B⁴.

It is sometimes required to drain the ammonia entirely from the coils. To attain this I provide the connections D³, one for each, connecting low points in the coils with the drain header B⁸, each controlled by a cock or valve D⁴. During the operation of the condensers these valves D⁴ are kept tightly closed.

It is sometimes desired to enlarge or contract the capacity of the condenser. I provide joints which allow this, and also facilitate the manufacture and transportation.

D⁵ is a cock or valve at the point shown in the discharge pipe D which can be opened to facilitate drainage at intervals if required. This is ordinarily kept closed, and the pipe D discharges not directly but by the liquid ammonia ascending in the pipe E*, which serves for this purpose in addition to its duty in connection with the equalizing pipe E and at a convenient height on this pipe, a connecting pipe D⁶ D⁷ extends along over the line of the discharge, and makes an independent union with the latter. This construction serves as a trap or liquid seal, and prevents the discharge of unliquefied gas from the condenser under any conditions.

Operation: The gaseous ammonia introduced at the bottom in rising in the condenser changes its condition by condensation to that of a dense liquid. The liquid is retained and tends by its gravity to descend, but such descent is opposed by the strongly ascending current of gaseous ammonia and there is active agitation. The result is an intimate mingling of the gas received at the bottom with the liquid in various degrees of coldness occupying the interior of the pipes, and finally the liquid alone to which all becomes reduced flows away cold from the top.

As compared with the ordinary methods of operating, there is a greatly increased condensing surface by my method. The whole exteriors of all the globules of gas throughout every portion of the interior space in the coil is lying in contact with and completely surrounded by a bath of cooler liquefied ammonia. All that great area is condensing surface and is ample to effect the condensation, and the entire interiors of all the pipes and the returns is available with the increased efficiency of five to one as compared to the ordinary method, for the transfer of the heat to the metal and thence to the cooling water.

The ammonia vapor or gas which enters the lowest pipe of each coil in a strong current and at a high velocity will intermingle mechanically with the liquid contained therein and the mixture will thus be forced rapidly upward. The cold water should be supplied in such quantities according to the temperature that the gas will all be condensed several pipes below the top. The dense liquid alone will then travel upward through the upper pipes of each coil and being there subjected to the cooling action of the coldest water will itself be cooled to the lowest practicable degree, which is especially valuable in refrigeration.

Modifications may be made without departing from the principle or sacrificing the advantages of the invention. A greater or less number of coils may be associated in one condenser and a greater or less number of pipes may be joined in each. All may be of uniform diameter or the lowermost which convey the current of gas before it has been reduced in volume may with advantage be much the largest.

Fig. 3 shows a provision for introducing a part of the hot gaseous fluid a little above the bottom of the coils. This may be found expedient under some conditions as when the pipes of the coils are of uniform size and the gas is appreciably throttled in being compelled to pass its whole volume through the lower pipes.

Fig. 4 shows provisions for introducing the gas into a large bottom pipe which insures its agitation at that early stage. I esteem it a desirable form of those parts.

I claim as my invention:

1. In condensing gaseous ammonia under pressure, rendering available the capacity of liquids to receive and impart heat more rapidly than gas, by receiving the gas at a sufficient velocity to overcome much resistance by its momentum, retaining the liquid which is produced by the liquefaction in one part of the condenser, and leading it with the uncondensed gas indirectly by an upward incline into another part mingled together and agitated, so that the liquid serves to condense the gas by reason of the great area and the nature of the contact surfaces and to be itself kept cool by actively circulating in contact with the inclosing casing.

2. The method of condensing ammonia gas under pressure which consists in equalizing its gaseous pressure by means of an independent passage, mixing it with liquefied ammonia previously in place, trapping it to resist accidental motions, leading it indirectly upward impelled by the velocity by which the gas is received and cooling the whole externally.

3. The method of condensing ammonia gas under pressure consisting in equalizing the tension at all points, mixing it with liquid ammonia, conveying it indirectly upward and taking away the heat by water moving downward by gravity on the outer surface of the container.

4. The method of condensing ammonia gas which consists in mixing it with previously liquefied ammonia under pressure, taking away the heat through metal wetted on one side by water and on the other side by agitation of the mingled gaseous and liquefied ammonia, leading it indirectly upward impelled by momentum, retaining and using it as a condensing medium for further instalments, leading it away completely condensed and carrying it high so that the liquid is trapped against liability to be accidentally moved.

5. The method of liquefying gases consisting of discharging the gas into liquefied gas lying in tiers one above another partly separated and partly connected together, with the gas pressure equalized, subjected to an external cooling action during the operation, and causing the newly introduced gas to mingle with the liquefied ammonia and both to circulate intimately and to travel indirectly upward together until all the gas is liquefied.

6. The method of liquefying gases consisting of discharging the gas into a series of divided layers of gas the uppermost of which are entirely and the lowermost are partially condensed while active liquefaction is going on, causing the newly-inducted gas to intermingle with the liquefied gas and with the previously received gas, and all to travel forward and indirectly upward together and subjecting the globules of the uncondensed gas to the cooling action of the liquefied gas surrounding them while the whole is cooled by means of water or other cooling medium moving in a thermally diverse direction, and finally discharging the whole in a completely liquefied condition at the top.

7. The method of liquefying gases consisting of discharging the gas into a low point in a coil in which the upper pipes are entirely and the lower pipes partially filled with liquefied gas without draining the coil, and while subjecting the contents to a cooling action externally, and finally discharging the ammonia cold at the top.

8. In condensing gas under pressure rendering available the facility of receiving and imparting heat possessed by liquids and also promoting efficiency and economy by retaining the condensed gas mingled and agitated, allowing a free movement thereof, in a thermally diverse direction from that of the cooling medium, and with the pressure of the gas equalized, then trapping against accidental flow by carrying it to a high level.

9. In condensing gas under pressure leading the gas gradually upward through a suitable container and permitting a flow of cooling water downward over the container, retaining the liquid which is produced by the condensation at low points, mingling it with the uncondensed gas at higher points, receiving the gas at a sufficient velocity to overcome by its momentum the gravity of the liquid produced and carrying the mixture indirectly upward until all is condensed, and further, so as to deliver the condensed gas cold.

10. The method of condensing ammonia gas comprising the leading it rapidly but indirectly upward overheat conducting surfaces which are kept cooler, continuing the ascent until it is condensed, and causing the reduction of velocity to overcome by momentum the resistance of gravity as it changes to the denser form.

11. The method described of presenting gaseous ammonia with velocity and indirect ascending motion to heat conducting surfaces in a container, causing it to reduce its velocity so that its momentum will urge it forward, presenting a cooling agent, as a shower of water, to contact with the other face of the container, continuing the cooling action on the ascending ammonia after it is all condensed and taking away the liquid ammonia cold.

Signed at New York city in the county of New York and State of New York this 20th day of July A. D. 1911.

LOUIS BLOCK.

Witnesses:
Louis Block, Jr.,
Louis Ph Cohen.